(12) United States Patent
Wakeman (10) Patent No.: US 6,649,858 B2
(45) Date of Patent: Nov. 18, 2003

(54) MULTI-APPLICATION WELDING SYSTEM AND METHOD

(75) Inventor: Robert W. Wakeman, Watertown, SD (US)

(73) Assignee: Illinois Tool Works Inc., Glenview, IL (US)

( * ) Notice: Subject to any disclaimer, the term of this patent is extended or adjusted under 35 U.S.C. 154(b) by 0 days.

(21) Appl. No.: 09/907,010

(22) Filed: Jul. 17, 2001

(65) Prior Publication Data

US 2003/0015510 A1 Jan. 23, 2003

(51) Int. Cl.⁷ .................................................. B23K 9/18
(52) U.S. Cl. .................. 219/73.2; 219/136; 219/137.31
(58) Field of Search ............................. 219/137.31, 73, 219/136, 73.2

(56) References Cited

U.S. PATENT DOCUMENTS

| | | | | | |
|---|---|---|---|---|---|
| 2,478,525 A | * | 8/1949 | Cutrer | ................... | 219/137.61 |
| 2,666,832 A | * | 1/1954 | Landis et al. | ............... | 219/73.2 |
| 2,827,549 A | * | 3/1958 | Carlson | .................. | 219/137.44 |
| 2,881,305 A | * | 4/1959 | Wojciak et al. | ......... | 219/137.42 |
| 2,907,866 A | * | 10/1959 | Yenni | ........................ | 219/74 |
| 3,194,943 A | * | 7/1965 | Flora | ......................... | 219/73.2 |
| 3,596,786 A | * | 8/1971 | Bernard et al. | ......... | 219/137.52 |
| 3,692,971 A | * | 9/1972 | Kniepkamp | .................. | 219/73 |
| 5,205,469 A | * | 4/1993 | Capitanescu | ................. | 228/225 |

* cited by examiner

Primary Examiner—M. Alexandra Elve
Assistant Examiner—Kevin P. Kerns
(74) Attorney, Agent, or Firm—Fletcher Yoder (57) ABSTRACT

A welding gun includes a welding handle and at least one interchangeable assembly. A plurality of interchangeable assemblies are securable to the welding handle to enable the welding gun to be configured for operation in a plurality of welding applications. A first interchangeable assembly enables the welding gun to receive gas and wire. A second interchangeable assembly enables the welding gun to receive flux and wire. The welding gun is coupled to a power source. The welding gun may be coupled to a flux reservoir or a source of gas. The welding gun may be coupled to the system by a cable operable to convey wire, gas, and flux to the welding handle.

40 Claims, 5 Drawing Sheets

FIG. 6

MULTI-APPLICATION WELDING SYSTEM AND METHOD

FIELD OF THE INVENTION

The present invention relates generally to welding systems, and particularly to an arc welding system that has a welding gun that is configurable for use with a MIG welding system and with a submerged arc welding system.

BACKGROUND OF THE INVENTION

Arc welding is a method of joining two pieces of metal into one solid piece. An arc welding system typically comprises an electric power supply coupled to a welding gun housing an electrode. The electric power supply typically includes a conductive cable and a clamp for securing the conductive cable to a target metal to be welded. The target metal and conductive cable complete an electrical circuit between the electrode and the power supply when the electrode is placed against the target metal. The completion of the electrical circuit produces an arc between the electrode and target metal. The heat of the electric arc is concentrated and the heat of the arc melts the target metals. A filler material, e.g. the molten electrode, is added while the target metals are molten. The molten mass then cools and solidifies into one piece.

MIG (Metal Inert Gas) welding is one type of arc welding. MIG welding is also referred to as "wire-feed" or GMAW (Gas Metal Arc Welding). In MIG welding, a metal wire is used as the electrode to produce the arc. The wire is shielded by an inert gas and the metal wire acts as the filler for the weld. The inert gas is used to shield the point of contact of the electrode from outside contaminants and gases that may react with the molten material of the weld. Non-inert gases, such as $CO_2$, also may be used in MIG welding systems.

The wire and gas are typically fed through a hand-held welding gun. The welding gun enables a user to control the welding process. Typically, the wire and gas are fed to the welding gun from a power source coupled to a wire feeder and a source of gas, such as a gas cylinder. The welding gun, typically, has a switch, or trigger, that is coupled to the wire feeder. When the trigger is operated, gas and wire are fed through the handle from the gas cylinder and wire feeder, respectively. The welding gun enables the user to direct the gas and wire to the desired location on the target metals.

Submerged Arc Welding is another type of arc welding. In submerged arc welding, a granular flux, rather than a gas, is used. Typically, the flux is fed from a reservoir to the welding gun through a power source coupled to a wire feeder. The wire completes the electrical circuit and creates an arc to melt the object metal. In submerged arc welding, the actual point of metal fusion and the arc are submerged within flux. Typically, the flux is a granular composition of chemical and metallic materials that is continuously deposited just ahead of the electrode. The electrical current melts the electrode to form the weld puddle. The portion of the flux that is adjacent to the electrode tip and the puddle will melt, forming a slag layer that refines the weld and excludes air. Melted flux that has solidified is removed easily. Additionally, unmelted flux is reusable. Typically, the wire and flux also are fed through a welding handle. The welding handle, typically, has a switch, or trigger, that is coupled to the power source/wire feeder. When the trigger is operated, the flux and wire are fed through the handle from the wire feeder.

Currently, welding guns for MIG welding systems cannot be used with submerged arc welding systems. The entire welding gun must be replaced when changing the welding application from MIG welding to submerged arc welding, and vice versa. There exists a need for a welding gun that is adaptable for use with gas feed systems, such as MIG welding systems, and with flux feed systems, such as submerged arc welding systems.

Additionally, various components of welding guns will wear out over time. For example, a liner is typically used to guide the wire into the welding gun. The liner will fail over time due to the abrasive action of the wire moving through the inside of the liner. Additionally, the nozzles used to direct the flow of flux towards the target will be eroded over time due to the flow of flux. Current submerged arc welding guns are not adapted to having a user replace worn components. There exists a need for a submerged arc welding gun that enables a user to replace consumable portions of the welding gun.

SUMMARY OF THE INVENTION

The present technique provides a novel welding system and method designed to respond to such needs. According to one aspect of the present technique, a welding gun is featured. The welding gun comprises a welding handle and a plurality of interchangeable assemblies securable to the welding handle to enable the welding gun to be configured for operation in a plurality of welding applications. A first interchangeable assembly enables the welding gun to receive gas and wire. A second interchangeable assembly enables the welding gun to receive flux and wire.

According to another aspect of the present invention, a submerged arc welding conversion assembly is featured. The submerged arc welding conversion assembly enables the welding gun to be converted from use as a welding gun for a MIG welding system to use as a welding gun for a submerged arc welding system.

According to another aspect of the present invention, a welding system is featured. The welding system comprises a power supply, a welding gun, and a cable. The welding gun comprises a handle and a first neck assembly that is securable to the handle. The first neck assembly enables the welding gun to be used to perform submerged arc welding. The cable is operable to convey a wire from the power supply to the welding gun. The wire is electrically coupled to the power supply.

According to another aspect of the present invention, a multi-application welding gun system is featured. The welding gun system comprises a welding gun and a removable cable. The welding gun comprises a handle, a first neck assembly, a second neck assembly, and a removable cable. The first neck assembly is securable to the handle and is adapted to receive gas and electrode wire and then direct the gas and electrode wire to a desired location. The second neck assembly is securable to the handle and is adapted to receive flux and electrode wire and then direct the flux and electrode wire to a desired location. The removable cable assembly is operable to convey gas, flux, and electrode wire to the welding gun.

According to another aspect of the present invention, a welding cable assembly is featured. The welding cable assembly is operable to couple a wire electrode, gas, and flux to a welding gun.

According to another aspect of the present invention, a method of operating a welding system is featured. The method comprises the act of selecting one of a MIG welding configuration or a submerged arc welding configuration for a welding gun. The method also comprises the act of securing a MIG welding or a submerged arc welding specific assembly to a common welding handle so as to configure the welding gun for the selected welding configuration.

According to another aspect of the present invention, a method of enabling a user to replace damaged components of a submerged arc welding gun is featured. The method comprises the act of disassembling the submerged arc welding gun to access the damaged component. The method also comprises the acts of replacing the damaged component; and reassembling the submerged arc welding gun.

BRIEF DESCRIPTION OF THE DRAWINGS

The invention will hereafter be described with reference to the accompanying drawings, wherein like reference numerals denote like elements, and.

DETAILED DESCRIPTION OF THE PREFERRED EMBODIMENTS

Figure 1:
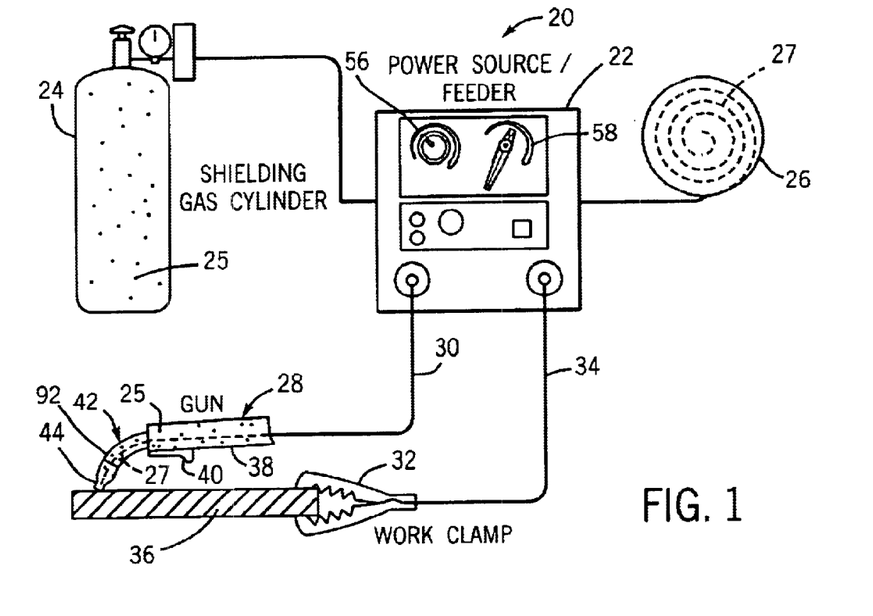
FIG. 1 is a diagram of a MIG welding system, according to an exemplary embodiment of the present technique.

Referring generally to FIG. 1, an exemplary metal inert gas ("MIG") welding system 20 is illustrated. The illustrated MIG welding system 20 comprises a power source/feeder 22, a gas cylinder 24 containing a gas 25 that is coupled to the power source/feeder 22, a spool 26 of electrode wire 27 that is coupled to the power source/feeder, a multi-application welding gun assembly 28 configured for use with a MIG system, a multi-application welding cable 30, a work clamp 32, and a ground cable 34.

The power source/feeder 22 is a source of electric power and directs the feeding of gas 25 and wire 27 to the multi-application welding cable 30. The multi-application welding cable 30 is operable to route gas 25 and wire 27 to the welding gun 28. Additionally, the multi-application welding cable 30 is operable to convey flux to the welding gun 28, as well as gas and wire, so that the cable 30 may be used with both MIG and submerged arc welding systems. However, a welding cable that is not operable to convey flux also may be used.

The work clamp 32 is clamped onto the conductive target material 36 to be welded. The work clamp 32 and a ground cable 34 electrically couple the power source/feeder 22 to the target material 36. Additionally, the wire 27 within the welding cable 30 is electrically coupled to the power source/feeder 22.

The multi-application welding gun assembly 28 is used to direct the wire to the target material 36 and to control the supply of gas 25 and wire from the power source/feeder 22 to the target 36. When the wire is touched to the target material 36, the electrical circuit is completed. Electricity from the power source 22 flows through the wire 27 and target material 36, producing an arc. The electric arc produces heat that melts the target material 36 in a region surrounding the point of contact between the wire 27 and the target material 36. The wire also acts as filler material. The heat of the arc melts the wire 27 along with the target material 36. The inert gas 25 forms a shield that prevents harmful chemical reactions from occurring at the weld site. When the arc is removed, the target material and the filler material solidify, forming the weld.

The welding gun 28 comprises a handle 38, a trigger 40, and a MIG neck/gun tube assembly 42. The welding cable 30 also has an electrical cable (not shown) that is electrically coupleable to the trigger 40. The trigger 40 enables a user to control the supply of gas 25, wire 27 and power from the power source/feeder 22. A number of events occur when the trigger 40 is operated. One event is that the power source/feeder 22 draws in wire 27 from the wire spool 26 and feeds it though the welding cable 30 to the welding gun 28. Additionally, gas 25 from the gas cylinder 24 flows through the welding cable 30 to the welding gun 28. Also, electric power from the power source/feeder 22 is supplied to the wire 27. The wire 27 and gas 25 are then fed through the MIG neck/gun tube assembly 42 towards the target material 36. The MIG neck/gun tube assembly 42 has a nozzle 44 that directs the wire 27 and gas 25 towards the target 36. When the trigger 40 is released, gas 25, wire 27, and electrical power are no longer fed to the welding gun 28.

Figure 2:
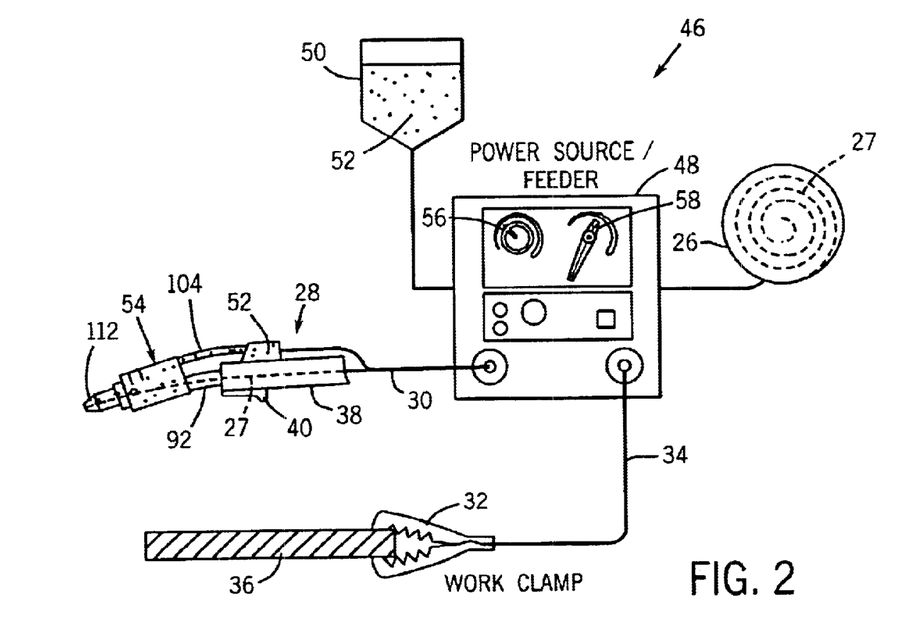
FIG. 2 is a diagram of a submerged arc welding system, according to an exemplary embodiment of the present technique.

Referring generally to FIG. 2, an exemplary submerged arc welding ("SMAW") system 46 is illustrated. The illustrated SMAW system 46 comprises a power source/feeder 48, a flux reservoir 50 containing flux 52, a wire spool 26, the multi-application welding gun assembly 28 configured for use with a SMAW system, the multi-application welding cable 30, a work clamp 32, and a ground cable 34. In the illustrated embodiment, the flux reservoir 50 is used to supply a powdered flux to the power source/feeder 48. As above, the wire spool 26 is used to supply wire 27 to the power source/feeder 48. The power source/feeder 48 receives the flux 52 and wire 27 from the flux reservoir 50 and wire spool 26, respectively, and feeds them to the multi-application welding gun assembly 28 through the multi-application welding cable 30. The multi-application welding cable 30 is operable to couple gas 25, in addition to flux 52, from the power source/feeder to the welding gun 28. However, a welding cable that is not operable to convey gas may be used. Also as above, the work clamp 32 is clamped onto a conductive target material 36 to electrically couple the power source/feeder 48 to the target material 36.

The multi-application welding gun assembly 28 is used to direct the wire 27 to the target material 36 and to control the supply of flux 52 and wire 27 to the target material 36. Touching the wire 27 to the target material completes the electrical circuit between the target 36 and the power source/feeder 48, electricity from the power source/feeder 48 flows through the wire 27 and target material 36, producing an arc. The electric arc produces heat that melts the target material 36 in the region surrounding the point of contact between the wire 27 and the target material 36. The arc is submerged within the flux 52.

In the illustrated embodiment, the multi-application welding gun assembly 28 comprises a handle 38, a trigger 40, and an SMAW neck/gun tube assembly 54. The welding cable 30 also has an electrical cable (not shown) that electrically couples the trigger 40 to the power source/feeder 48. The trigger 40 enables a user to control the supply of flux 52, wire 27 and power from the power source/feeder 48. When the trigger 40 is operated, the power source/feeder 48 draws in wire 27 from the wire spool 26 and feeds it though the welding cable 30. Also, flux 52 flows from the reservoir 50 and welding cable 30 to the welding gun 28. The wire 27 and flux 52 are fed through the SMAW neck/gun tube assembly 54 to the target material 36.

Referring generally to FIGS. 1 and 2, power source/feeder 22 may be the same as power source/feeder 48. Additionally, power source/feeder 22 and power source/feeder 48 may be a single combined unit or, alternatively, the power source/feeder may be comprised of a separate power source and a separate wire feeder that are coupled together. Additionally, power source/feeder 22 and power source/feeder 48 may have a variety of different features. For example, a power source/feeder may have a wire speed control 56 to enable a user to control the speed at which wire 27 is fed from the power source/feeder. Additionally, a power source/feeder may have a variable voltage control 58 to enable a user to control the voltage produced by the power source. The power source/feeder 22 and power source/feeder 48 also may have standard features. Additionally, two system specific welding cables may be used, rather than an interchangeable multi-application cable 30. For example, a welding cable adapted exclusively for use with a MIG welding system 22 may be used with the multi-application welding gun 28 and a welding cable adapted exclusively for use with an SMAW system 46 may be used with the multi-application welding gun 28.

Figure 3:
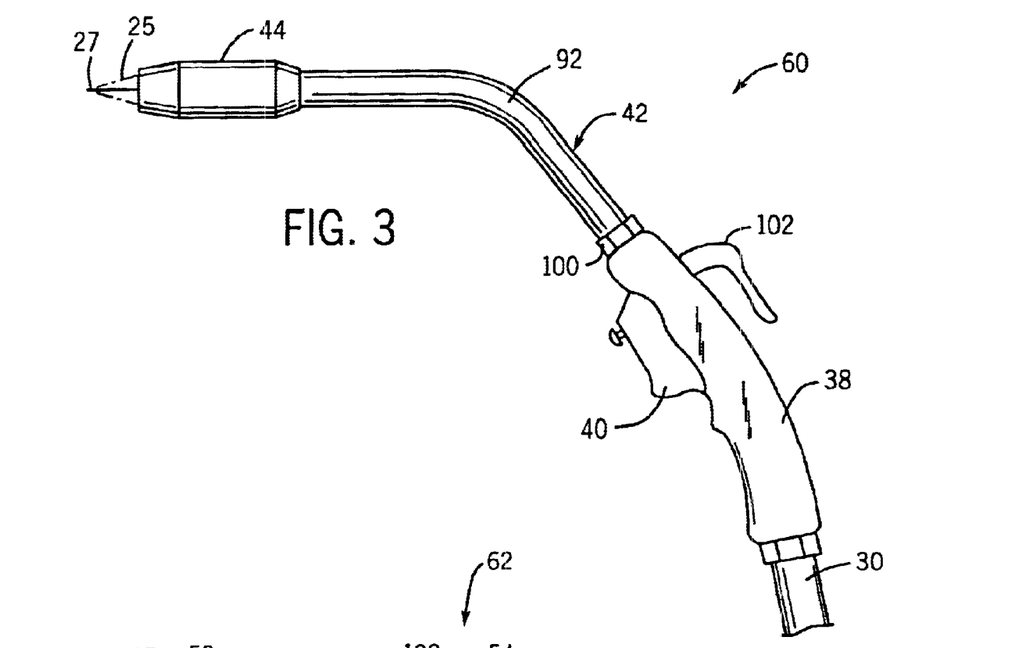
FIG. 3 is a front elevational view of a multi-application welding gun configured for use in the MIG welding system of FIG. 1.
Figure 4:
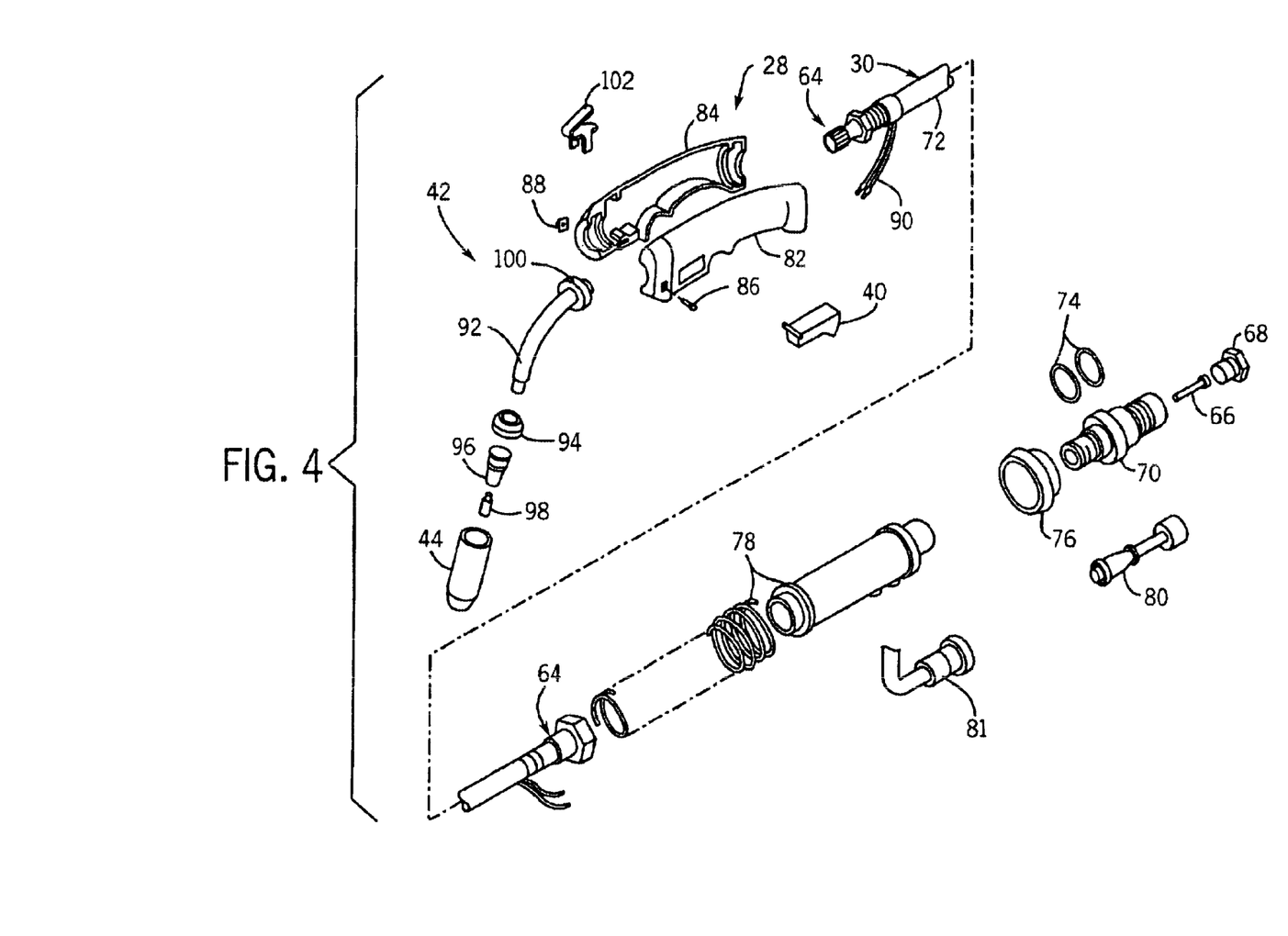
FIG. 4 is an exploded view of a multi-application welding gun configured for use in the MIG welding system of FIG. 1.
Figure 5:
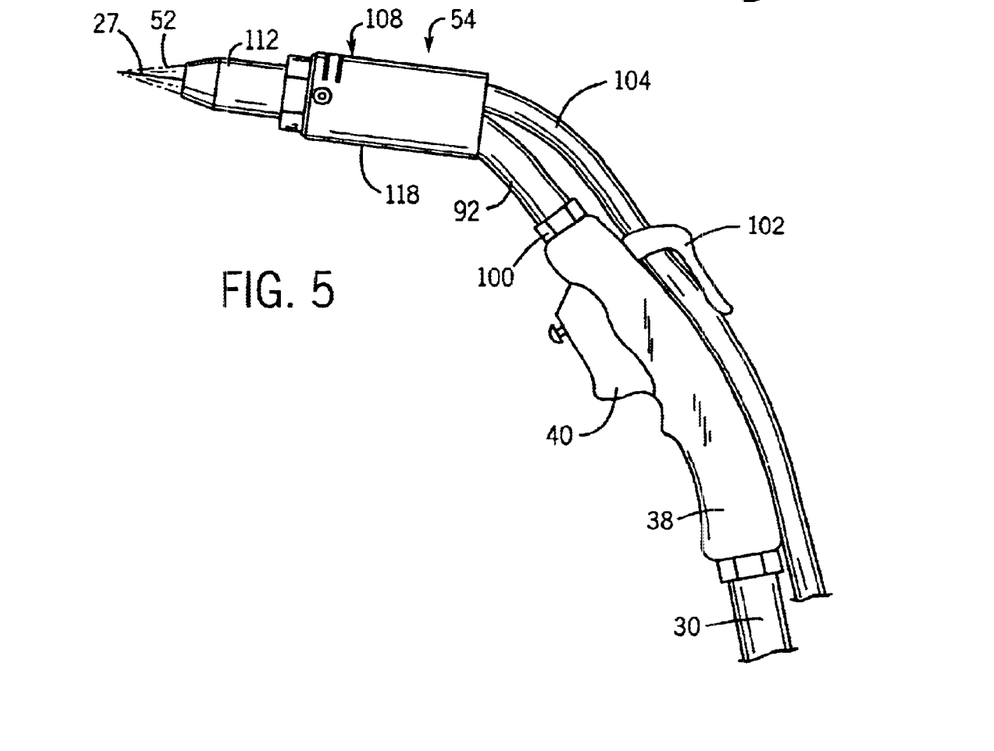
FIG. 5 is a front elevational view of a multi-application welding gun configured for use in the submerged arc welding system of FIG. 2.
Figure 6:
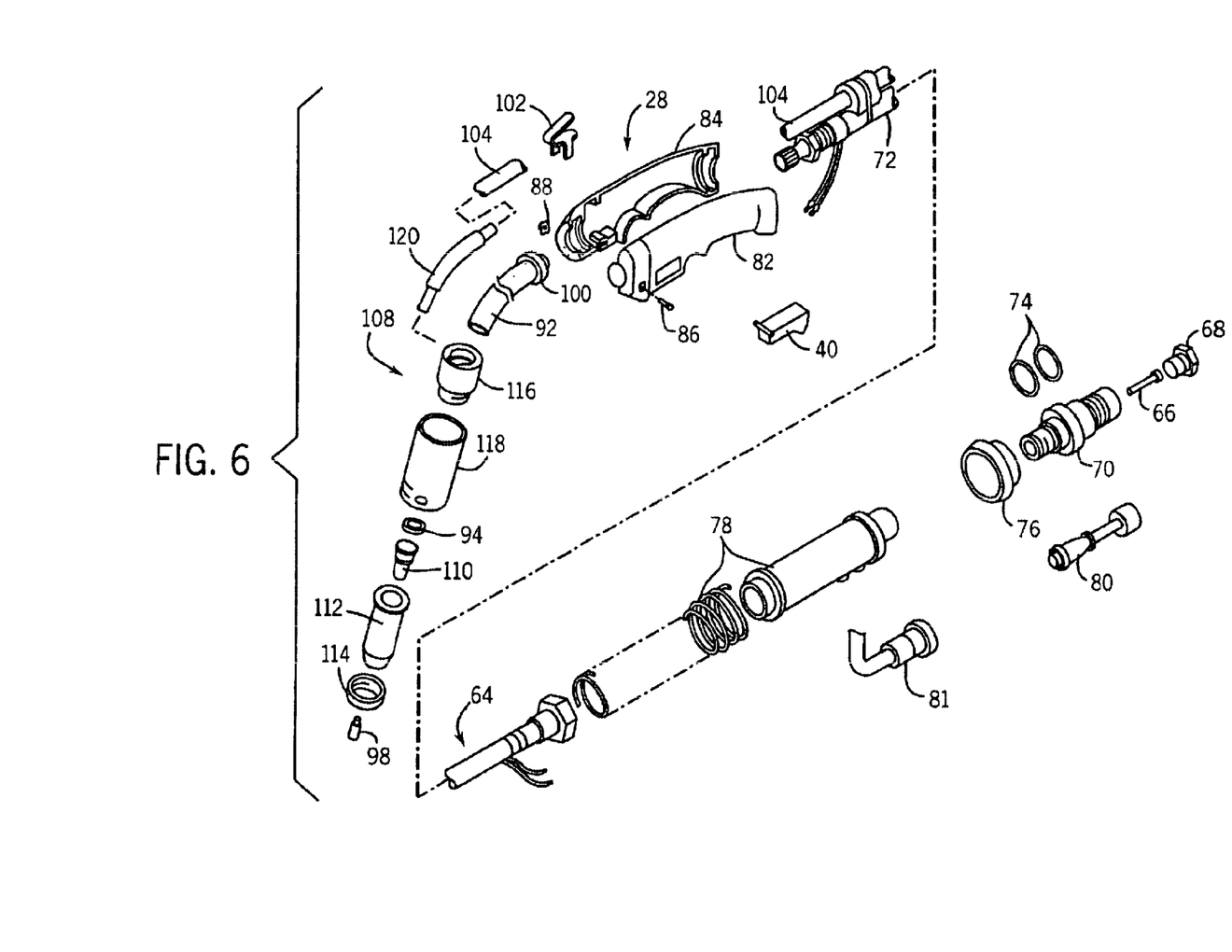
FIG. 6 is an exploded view of the multi-application welding handle configured for use in the submerged arc welding system of FIG. 2.

The multi-application welding gun assembly 28 is adapted so that it may be configured for use with either welding system application illustrated. Additionally, the multi-application welding gun 28 may be converted from use with one welding system application to use with the other. For example, the multi-application welding gun assembly 28 may be converted from use with the MIG welding system 20 to use with the SMAW system 46, and vice versa. Referring generally to FIGS. 3, 4, 5 and 6, the multi-application welding gun assembly 28 in shown in two embodiments. FIGS. 3 and 4 illustrate the multi-application welding gun assembly 28 configured as a MIG welding gun 60. FIGS. 5 and 6 illustrate the multi-application welding gun assembly 28 configured as a SMAW welding gun 62. The welding handle 38 is the same in both of the illustrated embodiments. In the illustrated embodiments, the neck/gun tube assemblies are interchangeable to enable the multi-application welding gun assembly 28 to be converted from use with one system to use with the other.

Referring generally to FIGS. 3 and 4, the MIG welding gun 60 and multi-application cable 30 are illustrated. In the illustrated embodiment, the welding cable 30 has a connector assembly 64 that couples the welding cable 30 to the welding handle 38. Electrode wire 27 from the multi-application welding cable 30 is fed into the connector assembly 64 through a liner 66. The liner 66 aligns the wire 27 through the connector assembly 64. Gas 25 also flows through the interior of the multi-application welding cable 30. In this embodiment of the multi-application welding cable 30, a separate hose (not shown) is used to couple flux 52. A locking nut 68 is used to secure the liner 66 to an adaptor plug 70. The liner 66 may be replaced by disconnecting the locking nut 68 from the adaptor plug 70 to access the liner 66. The outer portion 72 of the welding cable 30 is inserted over a portion of adaptor plug 70. In the illustrated embodiment, O-rings 74 are used to maintain a seal between adaptor plug 70 and outer portion 72 of welding cable 30. A retaining nut 76 is used to secure a support housing and support spring assembly 78 to the plug adaptor 70. A trigger cable adaptor 80 and trigger/switch electrical cord 81 are used to electrically couple the trigger 40 to the welding cable 30.

In the illustrated embodiment, the welding handle 38 is comprised of a left handle portion 82 and a right handle portion 84. The left and right handle portions are secured to each other by a screw 86 and a nut 88. Additionally, electrical leads 90 are used to electrically couple the trigger 40 to the trigger/switch electrical cord 81. This enables the trigger to control the operation of the power source/feeder 22.

The MIG neck/gun-tube assembly 42 comprises a neck 92, an insulator 94, a diffuser 96, a tip 98, a retaining nut 100, and a nozzle 44. The tip 98 is used to direct the wire 27. The insulator 94 is used to prevent electricity in the wire 27 from flowing through the neck 92 to the welding handle 38, shocking the user. The diffuser 96 is used to establish the desired flow characteristics of the gas 25, e.g., pressure. The nozzle 44 is used to direct the gas 25 to the target 36.

In the illustrated embodiment, the cable connector assembly 64 is connected to the MIG neck/gun-tube assembly 42 to assemble the welding gun. The left and right handle portions then are secured together around the connection between the MIG neck/gun-tube assembly 42 and the cable connector assembly 64. The MIG gun/tube assembly 42 is secured to the welding handle 28 by the retaining nut 100. Additionally, the MIG welding gun 60 may have a hook 102 that may be used to hang the MIG welding gun 60 from a mounting hook.

Referring generally to FIGS. 5 and 6, the SMAW welding gun 62 and multi-application welding cable 30 are illustrated. The multi-application cable has a flux hose 104 that channels flux 52 to the SMAW welding gun 62. In the illustrated embodiment, the flux hose 104 is not used when the multi-application welding handle 28 is configured as a MIG welding gun 60. The SMAW neck/gun tube assembly 54 comprises a neck 92, a flux distributor assembly 108, a flux diffuser 110, an insulator 94, a tip 98, a retaining nut 100, a nozzle 112, and a nozzle nut 114. As with the MIG system 20, the tip 98 is used to direct the wire 27 and the insulator 94 is used to prevent electricity in the wire 27 from flowing through the tip 98 to the welding handle 38, shocking the user. The flux diffuser 110 is used to establish the desired flow characteristics of the flux 52. The flux nozzle 112 is used to direct the flux 52 to the target 36. The neck 92 is used to couple the flux distributor assembly 108 to the welding handle 38. The SMAW neck/gun tube assembly 54, including the neck 92 and flux distributor assembly 108, are secured to the welding handle 28 by the retaining nut 100. The SMAW welding gun 62 may have a hook 102 that may be used to hang the SMAW welding gun 62 from a mounting hook.

Figure 7:
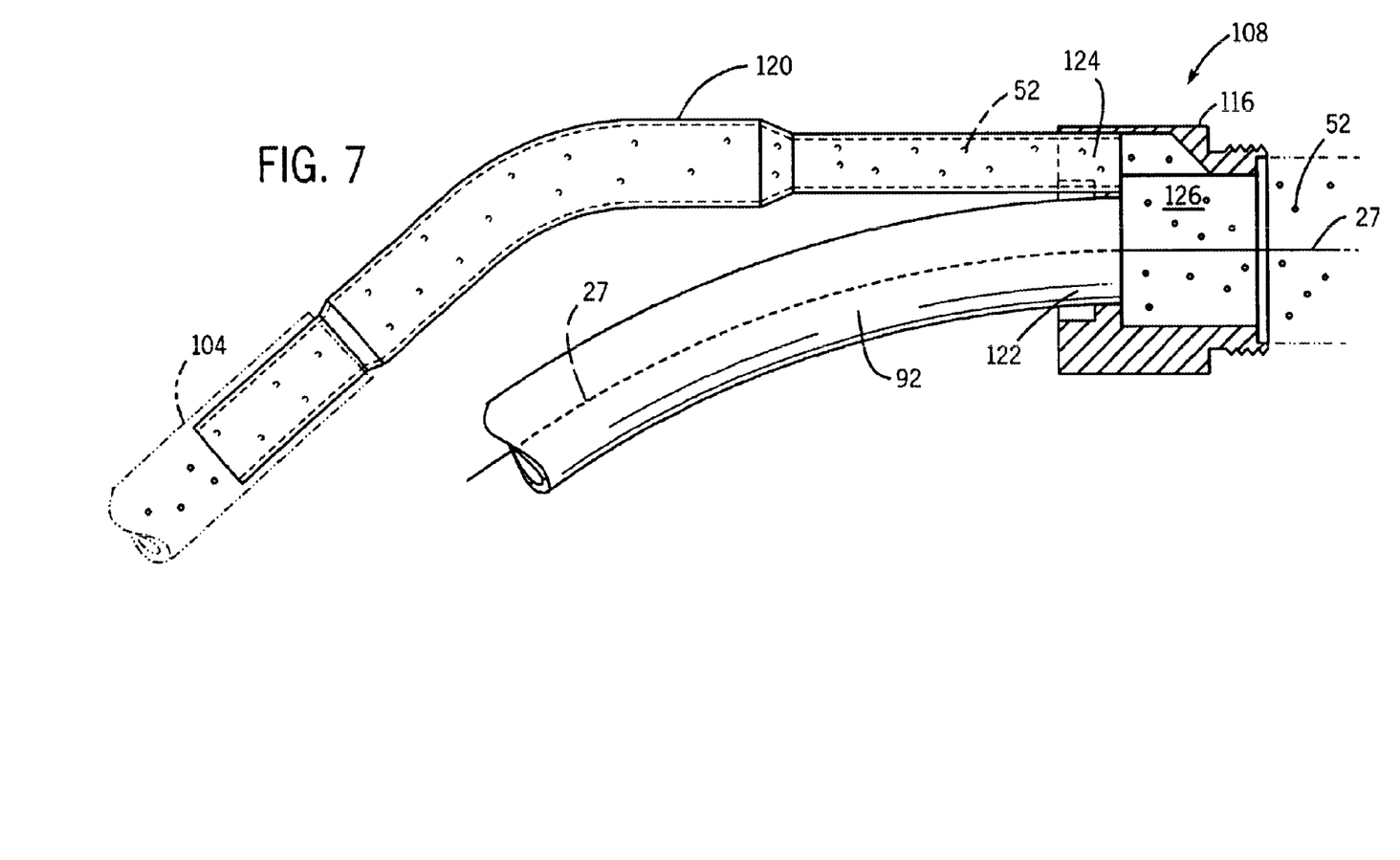
FIG. 7 is a cross-sectional view of a flux distributor.

The flux distributor assembly 108 comprises a flux distributor 116 and a shell 118 surrounding the flux distributor 116. As best illustrated in FIG. 7, the flux distributor has a hose connector portion 120. The hose connector portion 120 is used to couple the flux hose 104 to the flux distributor 116. The flux distributor 116 also is coupled via the neck 92 to the welding handle 38. The flux distributor 116 receives a flow of wire 27 via the neck 92 and a flow of flux 52 via the flux hose 104. The neck 92 is disposed within a first passageway 122 of the flux distributor 116. The hose connector portion 120 is disposed within a second passageway 124 of the flux distributor 116. The flow of wire 27 and the flow of flux 52 are merged in a chamber 126 within the flux distributor. The wire 27 and flux 52 then pass through the remaining portions of the SMAW neck/gun tube assembly 54, e.g. the flux diffuser 110 and the tip 98, to the target material 36.

As discussed above, the multi-application welding gun assembly 28 is configured for a particular application by the selection of the appropriate neck/gun tube assembly. To configure the multi-application welding gun assembly 28 for MIG welding, the MIG neck/gun tube assembly 42 adapted for use with the MIG welding system 20 is secured to the handle 38. Alternatively, to configure the multi-application welding gun assembly 28 for submerged arc welding, the SMAW neck/gun tube assembly 54 adapted for use with the submerged arc welding system 46 is secured to the handle 38. In addition, the multi-application welding gun assembly 28 may be converted from being configured for use with one application to use with another by changing the neck/gun tube assemblies.

The multi-application welding gun assembly 28 may be provided to a customer with a plurality of neck/gun tube assemblies for each of a plurality of different welding applications. Alternatively, the multi-application welding gun assembly 28 may be sold with a single neck/gun tube assembly, corresponding to a single welding application, MIG welding, for example. A conversion kit comprising a neck/gun tube assembly for a second, different welding application may then be purchased to enable the multi-application welding gun assembly 28 to be converted to use with a different welding application, submerged arc welding, for example. Additionally, a kit may be provided that comprises the multi-application welding gun 28, including the MIG neck/gun tube assembly 42 and the SMAW neck/gun tube assembly 54, and the multi-application welding cable 30. This would allow the welding gun to be used with a plurality of different systems.

It will be understood that the foregoing description is of preferred exemplary embodiments of this invention, and that the invention is not limited to the specific forms shown. For example, the regulator may be a dual-regulator system. Additionally, the regulator may be used with gas welding systems, compressed air systems, or any other suitable system utilizing a pressure regulator. Furthermore, the regulator may be configured to control pressure over a variety of pressure ranges. These and other modifications may be made in the design and arrangement of the elements without departing from the scope of the invention as expressed in the appended claims.

What is claimed is:

1. A welding gun, comprising:
    a welding handle to enable a user to direct the welding gun; and
    a plurality of interchangeable assemblies securable to the welding gun, comprising a first interchangeable assembly enabling the welding gun to receive a shielding gas and a wire electrode via a welding cable and to direct the gas and wire to a desired location, and a second interchangeable assembly enabling the welding gun to receive a flux and a wire electrode and to direct the flux and wire electrode to a desired location.

2. The welding gun as recited in claim 1, wherein the first interchangeable assembly enables a user to perform MIG welding with the welding gun and the second interchangeable assembly enables a user to perform submerged arc welding with the welding gun.

3. The welding gun as recited in claim 1, wherein the welding gun is coupleable to a power source via a removable welding cable.

4. The welding gun as recited in claim 1, wherein the welding gun is coupleable to a welding cable operable to convey gas, flux, and wire to the welding gun.

5. The welding gun as recited in claim 1, wherein the second interchangeable assembly comprises:
    a first portion securable to the welding handle, wherein the first portion is adapted to receive wire via the welding handle;
    a second portion secured to the first portion, wherein the second portion is adapted to receive flux; and
    a third portion secured to the first portion, wherein the third portion is adapted to receive wire via the first portion and flux via the second portion.

6. The welding gun as recited in claim 5, wherein the second portion is adapted to receive a hose routed from a source of flux.

7. The welding gun as recited in claim 1, wherein the plurality of interchangeable assemblies are secured to the handle by a retaining nut.

8. An arc welding gun, comprising:
    a flexible welding cable adapted to convey electrode wire;
    a handle secured to the welding cable;
    a trigger secured to the welding handle and operable to control operation of the welding gun; and
    a neck assembly removably secured to the welding cable and adapted to receive electrode wire from the welding cable and flux from a source of flux to enable the welding gun to perform submerged arc welding.

9. The welding gun as recited in claim 8, wherein the neck assembly is operable to receive a flow of flux from the source of flux and a flow of wire from the welding cable and merge the flow of flux with the flow of wire.

10. The welding gun as recited in claim 9, wherein the neck assembly comprises a removable nozzle to direct the flow of flux from the welding gun.

11. The welding gun as recited in claim 9, wherein the neck assembly comprises a hose connector portion adapted to couple the second neck assembly to a flux hose conveying flux from a source of flux.

12. The welding gun as recited in claim 9, wherein the neck assembly comprises a tubular neck operable to receive wire from a source of wire via the welding handle.

13. A submerged arc welding conversion assembly, comprising a neck assembly adapted to enable a welding gun operable to control operation of a welding system to be converted from use as a welding gun for a MIG welding system to use as a welding gun for a submerged arc welding system, the neck assembly comprising:
    a first portion coupleable to a flexible welding cable adapted to convey gas and wire for MIG welding; and
    a second portion coupleable to a hose adapted to convey flux for submerged arc welding.

14. The submerged arc welding conversion assembly as recited in claim 13, comprising a welding handle securable to the welding cable.

15. The submerged arc welding conversion assembly as recited in claim 14, wherein the neck assembly comprises a flux distributor operable to direct a flow of flux around the wire.

16. The submerged arc welding conversion assembly as recited in claim 14, wherein the neck assembly comprises a diffuser to decrease flux speed from the welding gun.

17. The submerged arc welding conversion assembly as recited in claim 14, wherein the neck assembly comprises a tip to direct wire from the welding gun.

18. A welding system, comprising:
    a power supply;
    a welding gun, comprising:
        a first neck assembly, wherein the first neck assembly enables the welding gun to be used to perform submerged arc welding, the first neck assembly being adapted to merge flux from an external source of flux via a hose coupled to the first neck assembly with electrode wire in a chamber within the neck assembly;

a welding cable operable to convey an electrode wire from the power supply to the first neck assembly, the wire being electrically coupled to the power supply; and a handle secured to the welding cable.

19. The welding system as recited in claim 18, wherein the cable is operable to convey gas and flux to the welding gun.

20. The welding system as recited in claim 18, further comprising a wire feeder to feed wire to the welding gun.

21. The welding system as recited in claim 18, further comprising a second neck assembly securable to the handle, wherein the second neck assembly enables the welding gun to be used to perform MIG welding.

22. The welding system as recited in claim 21, further comprising at least one gas cylinder coupled to the second neck assembly via the cable.

23. The welding system as recited in claim 18, further comprising a flux reservoir coupled to the first neck assembly via the cable.

24. A multi-application welding system, comprising:
   a power supply;
   a wire feeder having a supply of wire electrically coupled to the power supply;
   a welding gun, comprising:
      a handle to enable a user to direct the welding gun; and
      a plurality of neck assemblies interchangeably securable to the welding gun, a first neck assembly being adapted to receive gas and electrode wire and direct the gas and electrode wire to a desired location, and a second neck assembly being adapted to receive flux and electrode wire and direct the flux and electrode wire to a desired location; and
      a removable cable assembly operable to direct the gas and the electrode wire to the welding gun.

25. The multi-application welding system as recited in claim 24, wherein the at least one removable cable assembly is a single removable cable assembly operable to direct electrode wire, gas, and flux to the welding gun.

26. The multi-application welding system as recited in claim 25, wherein the single removable cable assembly is adapted to direct the gas and flux through separate portions of the single removable cable assembly.

27. The multi-application welding system as recited in claim 24, wherein the at least one removable cable assembly comprises a removable liner to direct the wire into the welding gun.

28. A multi-application welding system, comprising:
   a welding gun, comprising:
      a handle;
      a first neck assembly adapted to receive gas and electrode wire and direct the gas and electrode wire to a desired location;
      a second neck assembly adapted to receive flux and electrode wire and direct the flux and electrode wire to a desired location; and
      a removable cable assembly operable to convey gas, flux, and electrode wire to the welding gun.

29. The multi-application welding system as recited in claim 28, wherein the removable cable assembly is coupleable alternately to a source of flux and to a source of gas.

30. A method of operating a welding system, comprising the act of:
   coupling a submerged arc welding neck assembly to a welding cable operable to convey gas and electrode wire to enable a welding gun to receive flux for submerged arc welding.

31. The method as recited in claim 30, further comprising the act of coupling the cable to a source of flux to perform submerged arc welding.

32. The method as recited in claim 30, further comprising the act of replacing the submerged arc welding neck with a MIG welding neck and coupling the welding cable to a source of gas to enable the welding gun to perform MIG welding.

33. A method of replacing damaged components of a submerged arc welding gun, comprising the acts of:
   disassembling a neck assembly adapted to combine flux from a hose and electrode wire from a welding cable of the submerged arc welding gun in a chamber within the neck assembly to access a damaged component housed within the neck assembly;
   replacing the damaged component; and
   reassembling the submerged arc welding gun.

34. The method as recited in claim 33, wherein disassembling comprises removing a removable cable assembly from a welding handle to access the damaged component.

35. The method as recited in claim 33, wherein disassembling comprises removing a removable neck assembly from a welding handle to access the damaged component.

36. An arc welding gun kit, comprising:
   a welding handle;
   a first neck assembly securable to the welding handle and a welding cable adapted to convey gas and electrode wire which enables the welding gun to be used to perform a first type of welding; and
   a second neck assembly securable to the welding handle which enables the welding gun to be used to perform a second type of welding.

37. The arc welding gun kit as recited in claim 36, wherein the first type of welding is MIG welding and the second type of welding is submerged arc welding.

38. A neck assembly for an arc welding gun, comprising:
   a flux distributor adapted to receive flux from a hose and electrode wire from a welding cable, the flux distributor having a chamber adapted to merge the flux and the electrode wire into a single passageway;
   a flux diffuser disposed downstream of the flux distributor and adapted to establish desired flow characteristics of the flux, and
   a nozzle disposed downstream of the flux diffuser to direct the flux from the neck assembly.

39. The neck assembly of claim 38, wherein the neck assembly is adapted to perform submerged arc welding.

40. A welding gun assembly, comprising:
   a first removable assembly adapted to replace a second removable assembly of a welding gun, the second removable assembly being coupleable to a welding cable adapted to convey electrode wire and gas to enable the welding gun to perform MIG welding, wherein the first removable assembly is adapted to be coupled to a source of flux and to the welding cable to enable the welding gun to perform submerged arc welding.

* * * * *